(12) United States Patent
Campbell et al.

(10) Patent No.: US 8,954,992 B2
(45) Date of Patent: Feb. 10, 2015

(54) DISTRIBUTED AND SCALED-OUT NETWORK SWITCH AND PACKET PROCESSING

(71) Applicant: International Business Machines Corporation, Armonk, NY (US)

(72) Inventors: Alexander P. Campbell, Kanata (CA); Keshav G. Kamble, Fremont, CA (US); Vijoy A. Pandey, San Jose, CA (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 75 days.

(21) Appl. No.: 13/842,907

(22) Filed: Mar. 15, 2013

(65) Prior Publication Data

US 2014/0282611 A1 Sep. 18, 2014

(51) Int. Cl.
 *G06F 3/00* (2006.01)
 *G06F 9/44* (2006.01)
 *G06F 9/46* (2006.01)
 *G06F 13/00* (2006.01)
 *G06F 9/54* (2006.01)

(52) U.S. Cl.
 CPC .......................................... *G06F 9/54* (2013.01)
 USPC .......................................................... 719/313

(58) Field of Classification Search
 None
 See application file for complete search history.

(56) References Cited

U.S. PATENT DOCUMENTS

| 7,248,585 | B2 * | 7/2007 | Kohn et al. | 370/392 |
|---|---|---|---|---|
| 7,315,456 | B2 * | 1/2008 | Mondor et al. | 361/788 |
| 7,415,024 | B2 | 8/2008 | Johnson et al. | |
| 7,453,899 | B1 | 11/2008 | Vaida et al. | |
| 7,620,775 | B1 | 11/2009 | Waxman | |
| 7,809,347 | B2 | 10/2010 | Yancey | |
| 8,238,255 | B2 * | 8/2012 | Suresh et al. | 370/242 |
| 2006/0251071 | A1 * | 11/2006 | Oh et al. | 370/390 |
| 2008/0123654 | A1 | 5/2008 | Tse-Au | |
| 2012/0089814 | A1 * | 4/2012 | Gupta et al. | 712/30 |

OTHER PUBLICATIONS

Mell, P. et al., "The NIST Definition of Cloud Computing", Special Publication, Version 15, Oct. 7, 2009, 2 pages, National Institute of Standards and Technology, Information Technology Laboratory, USA.

* cited by examiner

*Primary Examiner* — H S Sough
*Assistant Examiner* — William C Wood

(57) ABSTRACT

Embodiments of the invention relate to scaled-out and distributed network packet processors and switch central cores. One embodiment relates to a system including multiple central core processing devices, wherein each central core processing device includes: a virtual central core interface for establishing scaled-out and distributed virtual communication connections with the central core processing devices and a packet processor interface manager connected with multiple packet processing interfaces. Multiple packet processors each include: a packet processor thread manager for managing and processing packets received by central core processing devices and multiple central core processing interfaces for providing connectivity between the packet processors and the plurality of central core processing devices. The packet processing interfaces and the central core processing interfaces provide scaled-out and distributed connectivity of the packet processors to one or more central core processing devices.

24 Claims, 7 Drawing Sheets

DISTRIBUTED AND SCALED-OUT NETWORK SWITCH AND PACKET PROCESSING

BACKGROUND

Embodiments of the invention relate to switch and packet processing and, in particular, distributed and scaled-out packet and switch processing in network environments.

Network processors and switching application-specific integrated circuits (ASICs) contain multiple switching and packet processing cores that are tightly coupled together and are required to be on the same physical ASIC. Any switching ASIC that includes packet processing cores have fixed switching and packet processing bandwidth. A system using fixed switching and packet processing ASICs cannot add bandwidth dynamically by adding or attaching more switching and packet processing elements.

SUMMARY

Embodiments of the invention relate to scaled-out and distributed network packet processors and switch central cores. One embodiment relates to a system including multiple central core processing devices, wherein each processing device includes: a virtual central core interface for establishing scaled-out and distributed virtual communication connections with the central core processing devices and a packet processor interface manager connected with multiple packet processing interfaces. Multiple packet processors each include: a packet processor thread manager for managing and processing packets received by central core processing devices and multiple central core processing interfaces for providing connectivity between the packet processors and the plurality of central core processing devices. The packet processing interfaces and the central core processing interfaces provide scaled-out and distributed connectivity of the packet processors to one or more central core processing devices.

Another embodiment comprises another system. The system comprises a first application-specific integrated circuit (ASIC) including one or more central core processing devices. The one or more central core processing devices each comprises: a virtual central core interface for establishing scaled-out and distributed virtual communication connections with other central core processing devices and a packet processor interface manager coupled to a plurality of packet processing interfaces. A second ASIC includes one or more packet processors. The one or more packet processors comprises: a packet processor thread manager for managing and processing packets received by the one or more central core processing devices and a plurality of core processing interfaces for providing connectivity between the one or more packet processors and the one or more central core processing devices. The packet processor interface manager is coupled with the plurality of packet processing interfaces for scaled-out and distributed coupling of the one or more packet processors to the one or more central core processing devices.

One embodiment comprises a method comprising providing scaled-out and distributed virtual communication connections with a plurality of central core processing devices using a virtual central core interface. A plurality of packet processing interfaces are coupled for scaled-out and distributed connectivity of a plurality of packet processors with one or more central core processing devices. Packets received by central core processing devices are managed. Packet processors are dynamically added for connecting with the central core processing devices based on dynamic packet processing bandwidth demand.

These and other features, aspects, and advantages of the present invention will become understood with reference to the following description, appended claims, and accompanying figures.

DETAILED DESCRIPTION

Figure 1:
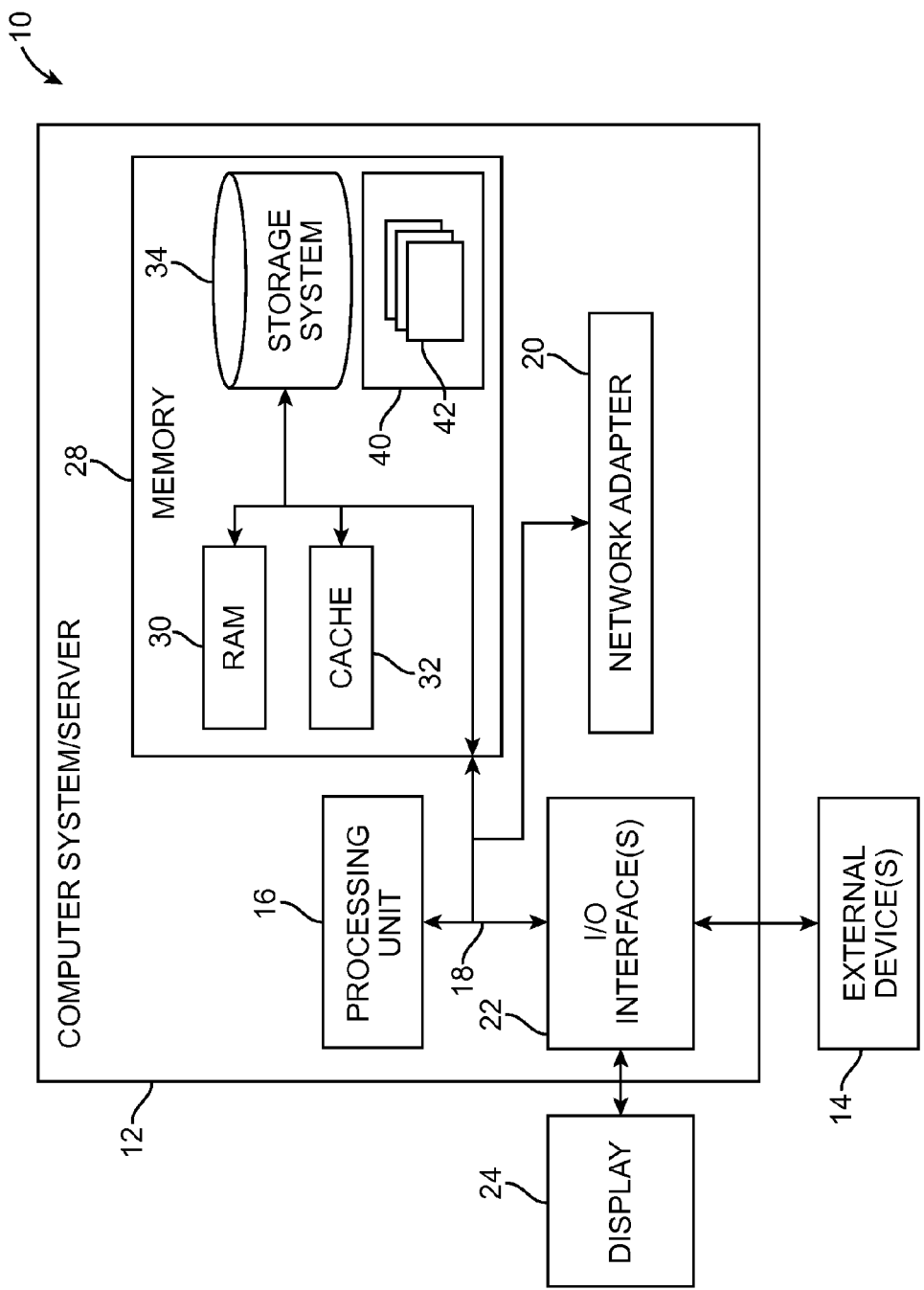
FIG. 1 depicts a cloud computing node, according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically (i.e., without requiring human interaction) with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify a location at a higher level of abstraction (e.g., country, state, datacenter, or enterprise network).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wired, optical fiber cable, radio-frequency (RF), etc., or any suitable combination of the foregoing.

Program/utility 40, having a set (at least one) of program modules 42, may be stored in memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
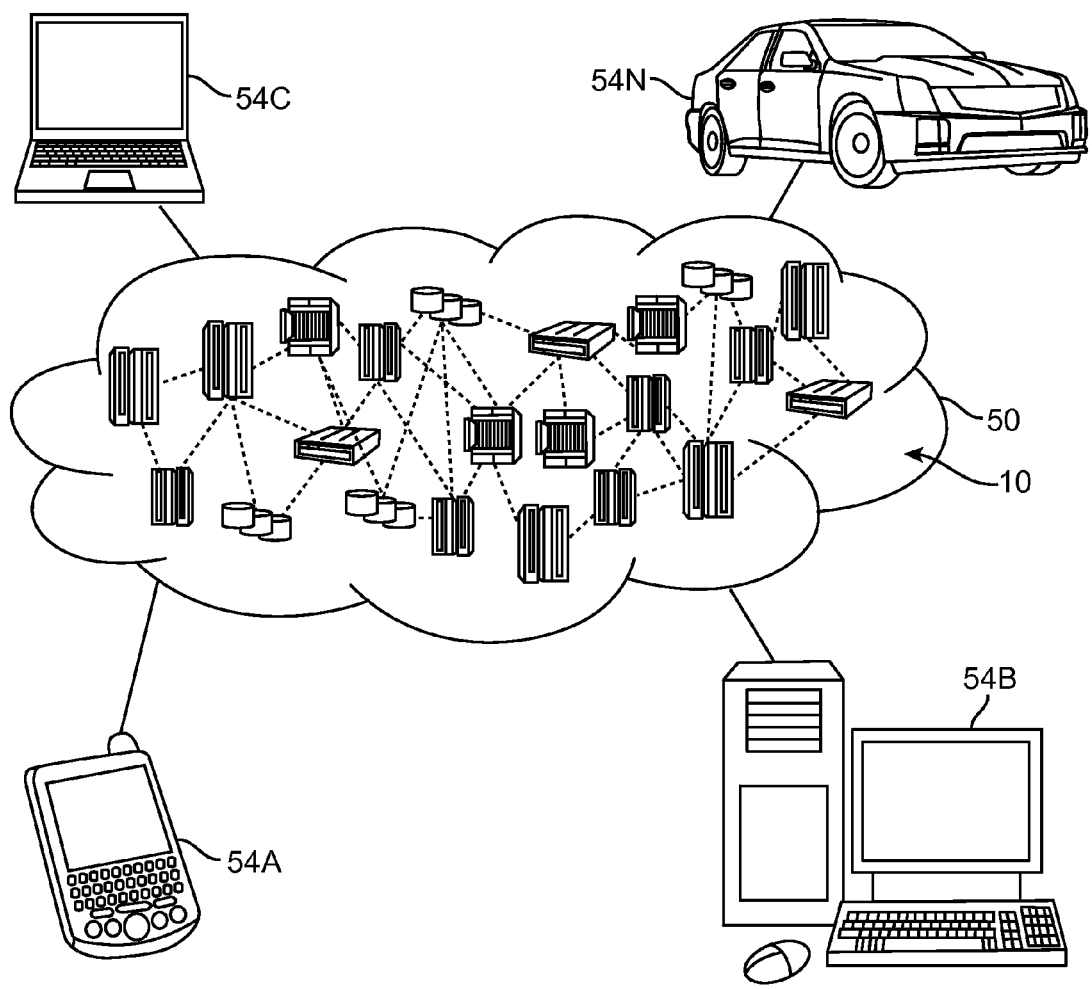
FIG. 2 depicts a cloud computing environment, according to an embodiment of the present invention.

Referring now to FIG. 2, a cloud computing environment 50 is illustrated. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
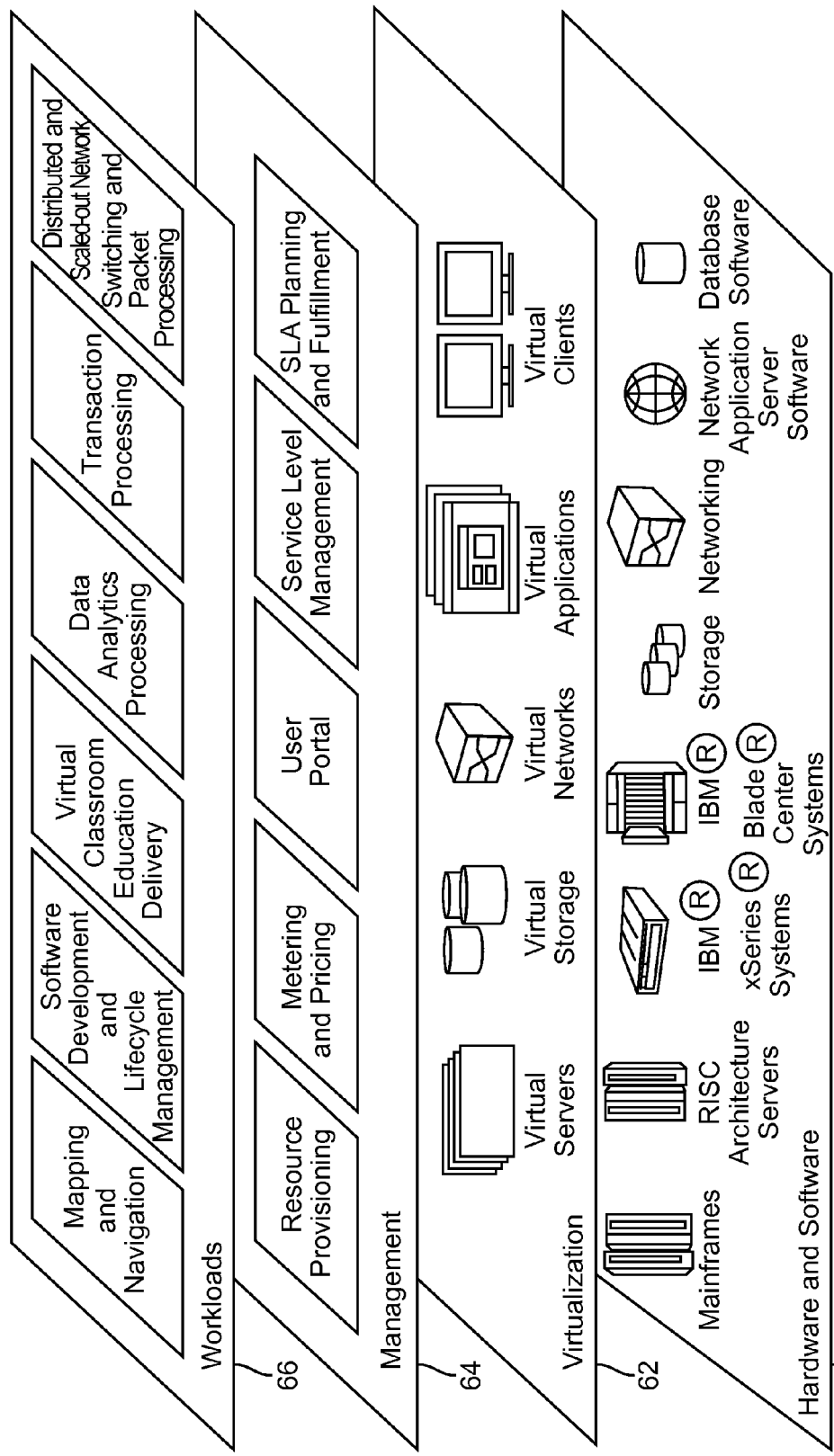
FIG. 3 depicts a set of abstraction model layers, according to an embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes. In one example, said hardware components comprise IBM® zSeries® systems and RISC (Reduced Instruction Set Computer) architecture-based servers. In one example, said hardware components comprise IBM pSeries® systems, IBM xSeries® systems, IBM BladeCenter® systems, storage devices, networks, and networking components. Examples of software components include network application server software. In one example, said software components comprise IBM WebSphere® application server software and database software. In one example, said software components comprise IBM DB2® database software (IBM, zSeries, pSeries, xSeries, BladeCenter, WebSphere, and DB2 are trademarks of International Business Machines Corporation registered in many jurisdictions worldwide.).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service-level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and scaling out and distributing switch and packet processing. As mentioned above, all of the foregoing examples described with respect to FIG. 3 are illustrative only, and the invention is not limited to these examples.

It is understood all functions of the present invention as described herein are typically performed by the system 600, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

According to an embodiment of the invention, a system includes multiple central core processing devices, wherein each processing device includes: a virtual central core interface for establishing scaled-out and distributed virtual communication connections with the central core processing devices and a packet processor interface manager connected with multiple packet processing interfaces. Multiple packet processors each includes: a packet processor thread manager for managing and processing packets received by central core processing devices and multiple central core processing interfaces for providing connectivity between the packet processors and the plurality of central core processing devices. The packet processing interfaces and the central core processing interfaces provide scaled-out and distributed connectivity of the packet processors to one or more central core processing devices. The embodiments provide facilities, architecture, interfaces, and logic for dynamically adding additional switching and packet processing bandwidth in an ASIC. By using the embodiments, as system/network bandwidth grows, the number of network interface ports and other interfaces used grow proportionately. The embodiments achieve distributed and scaled-out network processing and switching.

Figure 4:
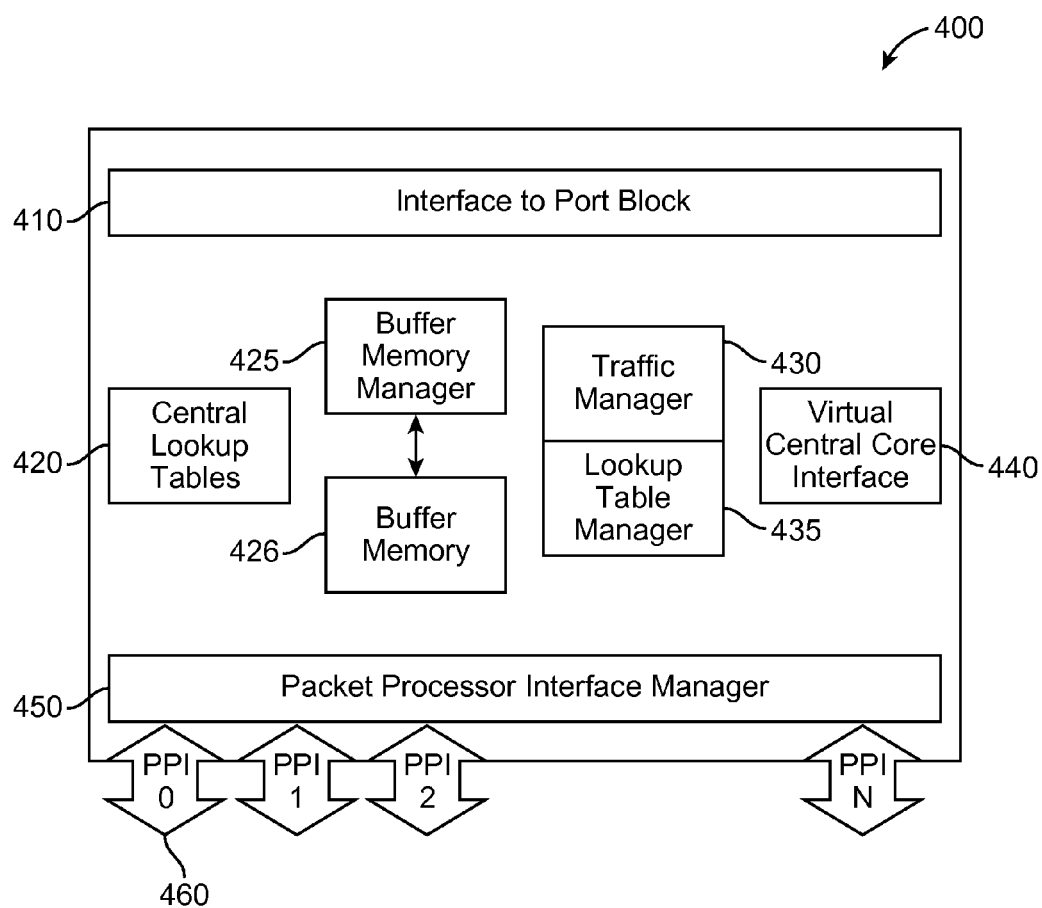
FIG. 4 illustrates a switching central core processing ASIC, according to an embodiment of the present invention.
Figure 5:
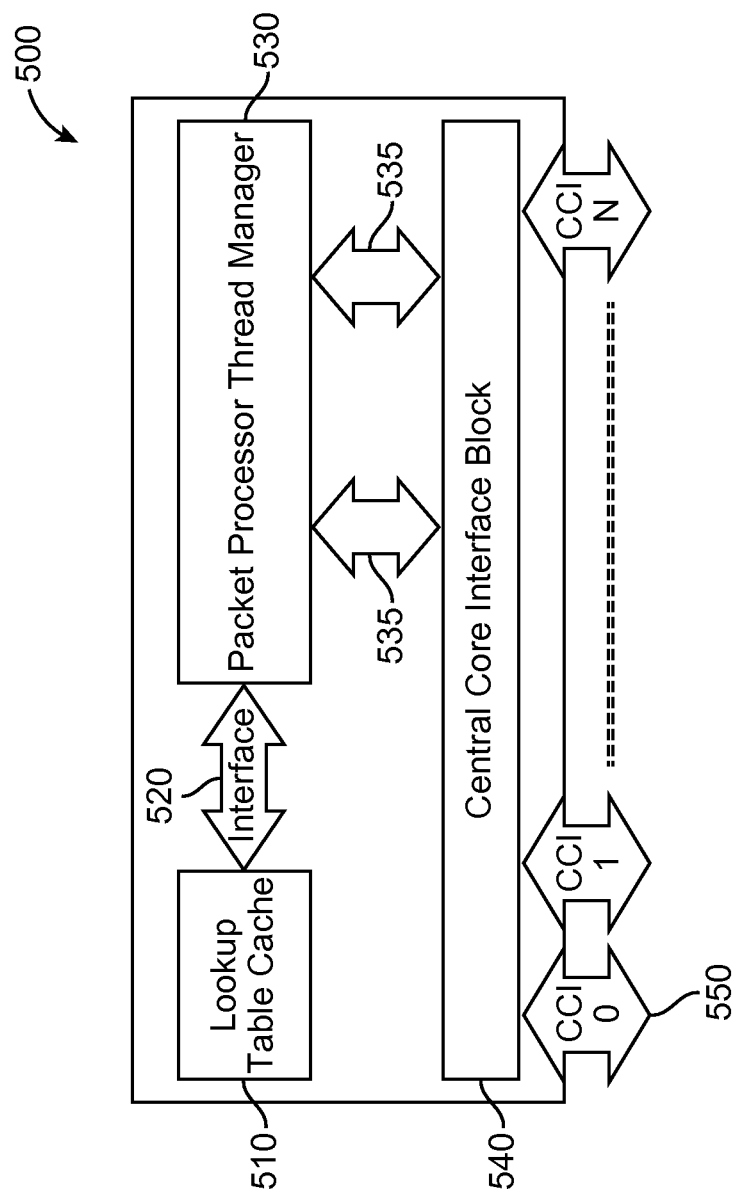
FIG. 5 illustrates a packet processing ASIC, according to an embodiment of the present invention.

FIG. 4 illustrates a switching central core processor ASIC 400 that operates in conjunction with the packet processor ASIC 500 shown in FIG. 5, according to an embodiment of the present invention. In one embodiment, multiple ASICs 400 and ASICs 500 may be deployed in physical networking devices in a physical network and used in one or more virtual networks. In one example, the physical network may include one or more computing nodes (e.g., cloud computing node 10), one or more computing environments (e.g., cloud computing environment 50), a data center, enterprise network, etc.

In one embodiment, ASICs 400 comprise physical ASIC blocks that receive network packets from port interface blocks of port blocks 605 (FIG. 6), perform buffer memory management, perform traffic management, perform management of lookup tables, and interconnect various packet processor ASICs 500 (FIG. 5) over high-speed interfaces. In one embodiment, the switching central core processor ASICs 400 form a scaled-out core system by establishing virtual interfaces with other switching central core processor ASICs 400 in the system environment in which they are deployed. In one embodiment, the switching central core processor ASICs 400 do not have any direct physical connectivity to each other, and all communication between switching central core processor ASICs 400 occurs over the virtual central core interface (VCCI) 440.

In one embodiment, the switching central core processor ASIC 400 includes an interface to port block (I2PB) 410, a central lookup table portion 420, a buffer memory manager 425, a buffer memory 426, a traffic manager 430, a lookup table manager 435, the VCCI 440, a packet processor interface manager/block 450, and a plurality of packet processor interfaces (PPIs) 460.

In one embodiment, the I2PB 410 comprises a set of serializers/deserializers (SerDes) for interfacing the network port interface blocks 605 (FIG. 6) and provides network port functionality. In one example, I2PB 410 may contain a media access control (MAC) pool of various types, for example, 10 Gigabit per second (Gbps) attachment unit interface (XAUI), reduced XAUI (RXAUI), 40 Gbps attachment unit interface (XLAUI), 100 Gbps attachment unit (CAUI), etc. Large number of SerDes may be sub-divided and allocated to each MAC pool or individual MACs. In some examples, the I2PB 410 may interface external MACs and physical (PHY) devices.

In one embodiment, the central lookup tables 420 may include ternary content-addressable memory (TCAM) or cache-based lookup tables and may be initialized and managed by the traffic manager 430 and lookup table manager 435. In one example, the central lookup table manager 435 contains logic for storing, deleting, and retrieving various lookup data information entries for the ASIC 400. In one embodiment, there may be multiple TCAM banks or cache blocks arranged together to form a bigger lookup table. The lookup entries may be Internet protocol version 4/6 (IPv4/6) unicast route tables (longest prefix match (LPM)), address resolution protocol (ARP) tables, host tables, MAC forwarding database (FDB) tables, multicast route tables, access control list (ACL) tables, etc., as required for full functionality of a desired switching system.

In one embodiment, the traffic manager (TM) 430 and lookup table manager (LTM) 435 may be provided in a single block or separate blocks. In one embodiment, the TM 430 and LTM 435 perform traffic management and lookup table management, respectively. In one example, the TM 430 and LTM 435 blocks include interfaces to the central lookup tables 420 and the buffer memory manager 425. In one embodiment, the TM 430 manages various priority queues and virtual output queues (VOQs). In one example, these queues are allocated based on the number of network ports available in the I2PB 410 of a local ASIC 400 and all the I2PBs 410 of remote ASICs 400. In one example, the TM 430 applies various queuing algorithms for queuing network packets and performs intelligent algorithmic packet dropping if required. The TM 430 provides full functionality of performing traffic management of a switching system environment. In one example, the TM 430 also performs distributing packets to all the packet processors of the ASIC 500 (FIG. 5) for packet processing. In one embodiment, the TM 430 distributes packets based on distribution algorithms to maintain the packet sequence.

In one embodiment, the LTM 435 interfaces the TCAM/cache tables of the central lookup tables 420. In one example, the LTM 435 initializes the central lookup tables 420 based on configurations and also performs addition and deletion of entries from the central lookup tables 420. Synchronizing the central lookup table entries with the attached packet processors of ASIC 500 (FIG. 5) is provided by the LTM 435. As needed and when required, the LTM 435 sends the select number of entries to the designated packet processor of ASIC 500 for processing. In one example, the LTM 435 may interact with all the attached packet processors of ASIC 500 on a request-response basis.

In one embodiment, the buffer memory block 426 contains buffer memory required to store network packets arrived over the I2PB 410. In one example, the buffer memory 426 may be high-speed SRAM or other type of high-speed memory. In one embodiment, the buffer memory manager 425 manages the buffer memory 426 by partitioning the buffer memory 426 into multiple fixed or variable sized blocks. In one example, the buffer memory manager 425 may chain multiple memory buffers together if required for holding a "jumbo" sized frame. In one example, each buffer in the buffer memory 426 comprises a buffer header that represents the details of the physical buffer. In one embodiment, the buffer memory manager 425 works closely with the TM 430 and performs processing based on instructions from the TM 430.

In one embodiment, the packet processor interface (PPI) manager 450 manages interaction between the switching central core processor ASIC 400 and all of the packet processor ASICs 500 (FIG. 5) connected to it. In one embodiment, the PPIs 460 are high-speed parallel or serial interfaces between the switching central core processor ASIC 400 and all of the packet processor ASICs 500 deployed in a network system. In one example, all of the individual links in this interface may be divided into multiple groups as required to connect to packet processor ASICs 500. In one example, the PPI manager 450 and PPIs 460 may build the topology of the complete switching system by interacting with other blocks. The PPI manager 450 and PPIs 460 may also take care of any type of failure in the links and ensure there are no packets lost.

In one embodiment, the functionality of the VCCI 440 is to establish virtual/logical connections with the other central cores of the switching central core processor ASICs 400 present in a distributed switch device. In one example, the VCCI 440 works in unison with the PPI manager 450 and obtains updates from the PPIs 460 of any other central cores of a switching central core processor ASIC 400 in the system. In one example, once discovered, the VCCI 440 establishes a peer-to-peer relationship with the other central cores of switching central core processor ASICs 400 and facilitates exchange of switching information, such as lookup table content. The VCCI 440 maintains consistency of lookup table entries across the system. In one example, only select information may be exchanged for the functioning of other blocks. Therefore, the whole system may scale-up and does not have to waste lookup entries if they are not generated by the I2PB 410 of the local switching central core processor ASIC 400.

FIG. 5 illustrates packet processor ASIC 500 that operates in conjunction with the switching central core processor ASIC 400 shown in FIG. 4, according to an embodiment of the present invention. Packet processor ASICs 500 provide for scaling-out switching systems. In one example, there may be many (e.g., a dozen or more) packet processor ASICs 500 connected to one or more switching central core processor ASICs 400. In one embodiment, the packet processor ASIC 500 receives packets from the switching central core processor ASIC 400, pre-classifies packets, performs lookups for packet forwarding, adds metadata from the lookup results to the packets, and forwards the packets to the designated switching central core processor ASIC 400 based on the lookup results.

In one embodiment, the packet processor ASIC 500 includes a lookup table cache 510, an interface 520, a packet processor thread (PPT) manager 530, a plurality of connectivity threads 535, a central core interface (CCI) block 540, and a plurality of CCIs 0-N 550, wherein N is an integer greater than or equal to 0. In one embodiment, implementation of the packet processor ASIC 500 is flexible as long as there are common blocks included in the design. In one example, the common blocks (e.g., packet processor thread manager 530, connectivity threads 535, central core interface (CCI) block 540, and CCIs 0-N 550) enable interactions with the switching central core processor ASIC 400. In one example, as long as the predefined metadata format is maintained, providing packet processing using the packet processor ASIC 500 is flexible.

In one embodiment, the CCI block 540 using the CCIs 550 provides parallel or serial interface connectivity between the packet processor ASICs 500 and the switching central core processor ASICs 400. In one example, it may be necessary to connect the packet processor ASICs 500 to all available switching central core processor ASICs 400 to form a single coherent system and avoid multiple disconnected switching domains.

In one embodiment, the CCI block 540 interacts with all of the switching central core processor ASICs 400 through the CCIs 550 and builds a topology. By exchanging topology messages at a high frequency, the CCI block 540 ensures that any failures are immediately detected and traffic loss is avoided. In one example, the CCI block 540 forwards messages between the packet processor ASIC 500 and the switching central core processor ASIC(s) 400. The CCI block 540 also forwards messages sent by one switching central core processor ASIC 400 to other switching central core processor ASICs 400. In one embodiment, the CCI block 540 assists the VCCI 440 of a switching central core processor ASIC 400 to communicate with other switching central core processor ASICs 400. In one embodiment, the CCI block 540, as and when required, requests lookup table entries from the central cores, receives the entries and populates the entries in the local lookup table cache 510, which is performed if a lookup fault occurs (i.e., a lookup table entry is not found in the table).

In one embodiment, serdes lanes in CCIs 550 and PPIs 460 may be flexibly bundled to form interfaces of various bandwidths. In one embodiment, the number of lanes used is proportional to the packet processing capability/bandwidth of the packet processor 500. In one embodiment, for most of the processing, an original data packet stays in the buffer memory of the ingress central core block. The packet directly moves to a destination central core block after the packet processor 500 completes lookup, and informs the destination central core block to send the packet out.

In one embodiment, the PPT manager 530 using threads 535 receives packet headers from the switching central core processor ASIC 400 and performs lookups using the central lookup tables 420 of the switching central core processor ASIC 400. By performing lookups, the PPT manager 530 creates a list of actions to be taken on a packet along with forwarding decisions. This information is placed into a metadata header, which is then added onto a packet header. The combined information is then forwarded to a destination switching central core processor ASIC 400 for actual packet forwarding. In one example, during packet processing the actual packet remains in the buffer memory 426 of the receiving (ingress) switching central core processor ASIC 400 and only certain number of bytes starting from the header are sent to threads 535 for processing. The number of bytes to be sent from each packet is programmable, e.g., first 64 bytes, 128 bytes, 256 bytes, etc. In one example, if the destination switching central core processor ASIC 400 (based on the destination port of the packet) is not the same as the ingress switching central core processor ASIC 400, then the packet processor ASIC 500 informs the ingress switching central core processor ASIC 400 to forward the packet to the destination switching central core processor ASIC 400. The metadata may be sent with the packet or separately to the destination switching central core processor ASIC 400.

In one embodiment, the lookup table cache 510 is a subset of the central lookup tables 420 of the switching central core processor ASIC 400. The lookup table cache 510 receives forwarding entries from the central lookup tables 420 for lookup functionality. In one example, depending upon the workload, the packet processor ASIC 500 is required to maintain corresponding lookup entries in its local table. When required, the lookup table cache 510 may request the entries from central lookup tables 420 of any directly-connected switching central core processor ASICs 400. In one example, the lookup table cache 510 maintains a number of entries from each switching central core processor ASIC 400. The entries are based on the flows forwarded to the packet processor ASIC 500 by the switching central core processor ASICs 400. In one example, there may be other algorithms followed for distribution of lookup table entries, e.g. the switching central core processor ASICs 400 may distribute the lookup entries equally to all the directly-connected packet processor ASICs 500.

In one embodiment, messaging between packet processor ASICs 500 and switching central core processor ASICs 400 may include topology discovery messages; identification messages for discovery about types of service provided by one another; flow control messages; lookup table entries synchronization between switching central core processor ASICs 400 over the VCCI 440; and lookup table entries synchronization between switching central core processor ASICs 400 and packet processor ASICs 500, health and error code exchange messaging, etc.

Figure 6:
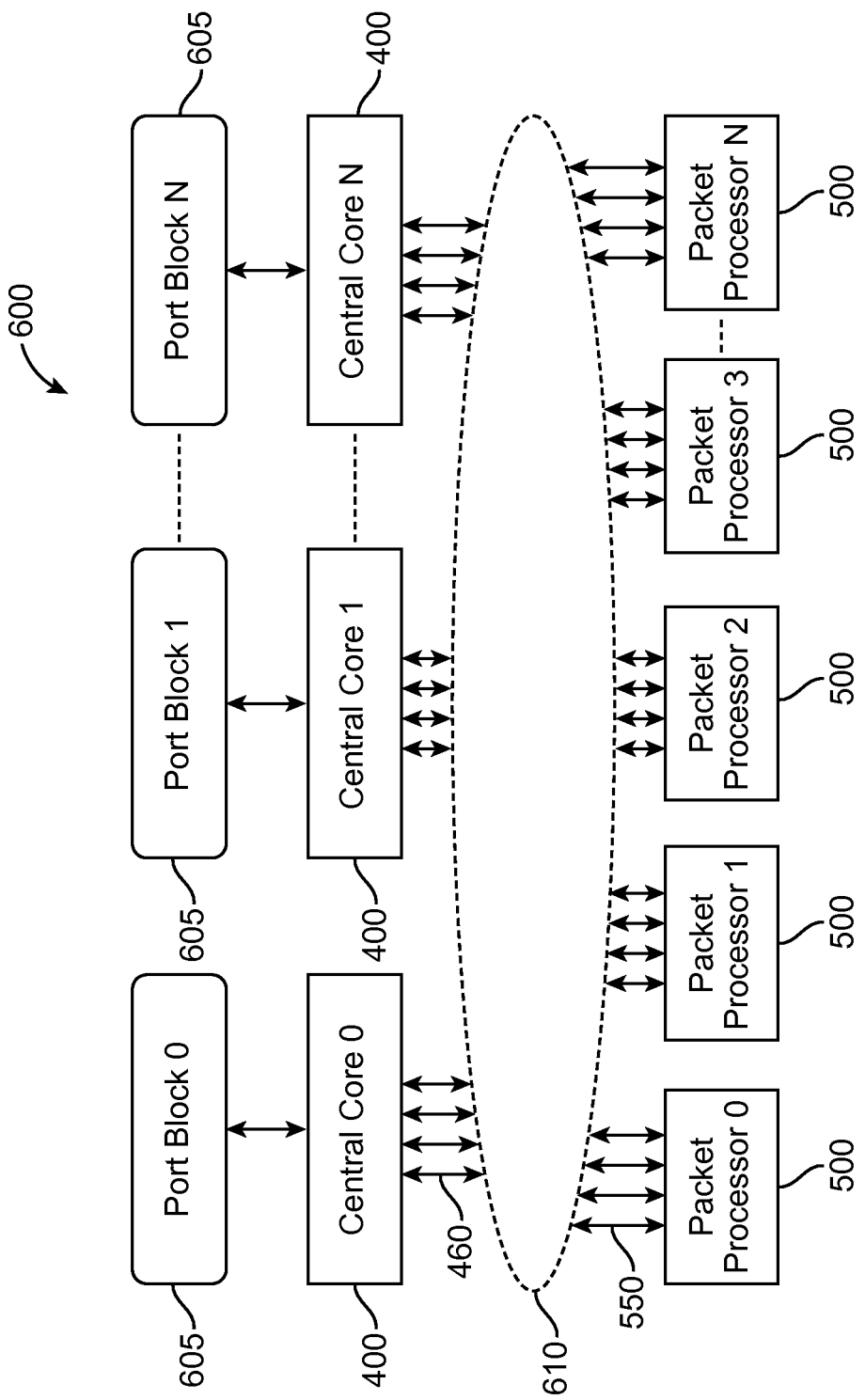
FIG. 6 illustrates a system, according to an embodiment of the present invention.

FIG. 6 illustrates a scaled-out and distributed switching system, according to an embodiment of the present invention. In one embodiment, the switching central core processor ASICs 400 are connected to the port blocks 0-N 605, wherein N is an integer greater than or equal to 0, through the I2PB 410 (FIG. 4) and are connected to the packet processor ASICs 500 via the PPIs 460 and CCIs 550, where the connectivity topology 610 may include physical and virtual connectivity between the switching central core processor ASICs 400 and the packet processor ASIC 500. In one embodiment, the packet processor ASICs 500 may be dynamically connected to the switching central core ASICS 400 based on bandwidth demand of the networking system environment (e.g., data center, enterprise network, etc.).

Figure 7:
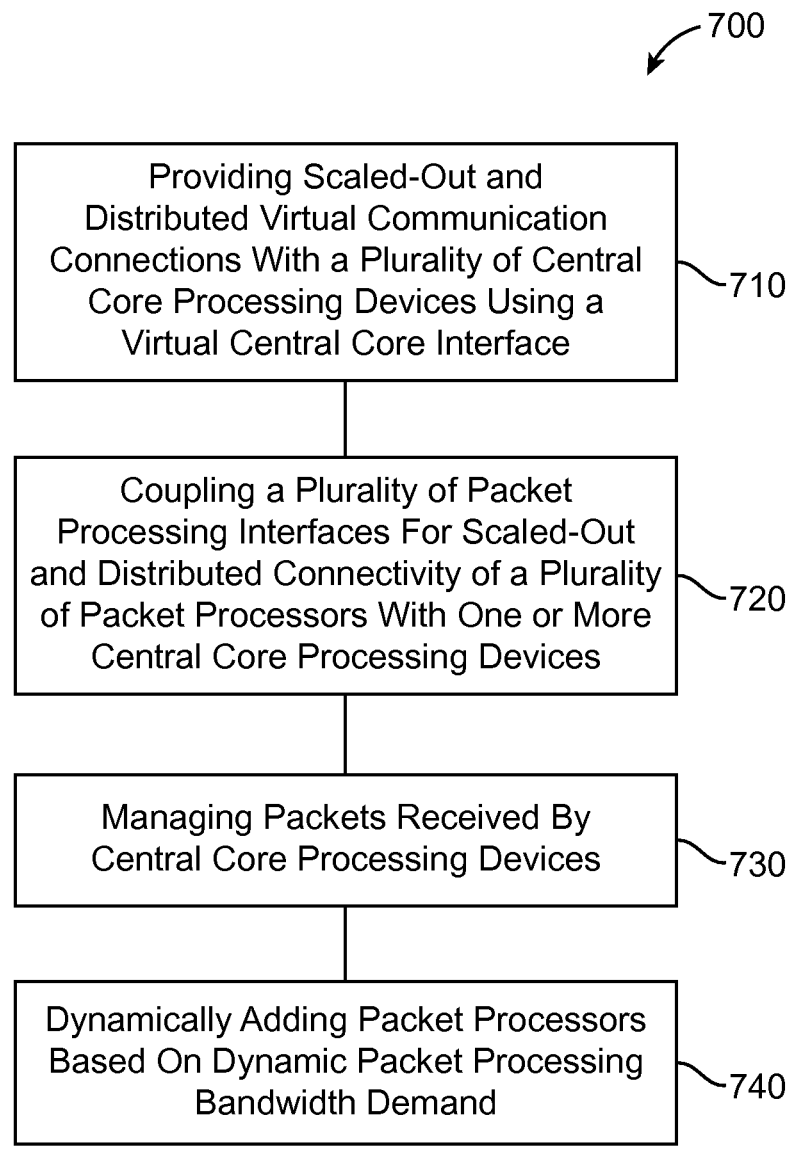
FIG. 7 is a flowchart showing a process for scaled-out and distributed switching and packet processing, in accordance with an embodiment of the invention.

FIG. 7 illustrates a flowchart of an example process 700 for distributed and scaled-out network switching in a system (e.g., the system 600), according to one embodiment. In process block 710, process 700 provides scaled-out and distributed virtual communication connections with a plurality of central core processing devices (e.g., switching central core processor ASICS 400) using a virtual central core interface (e.g., VCCI 440). In process block 720, a plurality of packet processing interfaces (e.g., PPIs 460) couple a plurality of packet processors (e.g., packet processor ASICs 500) with one or more central core processing devices (e.g., switching central core processor ASICs 400) using central core interfaces (e.g., CCIs 550) for scaled-out and distributed connectivity. In process block 730, packets received by central core processing devices (e.g., switching central core processor ASICs 400) are managed. In process block 740, packet processors (e.g., packet processor ASICs 500) are dynamically added for connecting with the central core processing devices (e.g., switching central core processor ASICs 400) based on dynamic packet processing bandwidth demand within a networking system.

In one embodiment, the process 700 further includes providing messaging between the packet processors and the central core processing devices using the plurality of central core processing interfaces (e.g., CCIs 550) and the plurality of packet processing interfaces (e.g., PPIs 460). In one example, messaging is exchanged between the plurality of central core processing devices through virtual connections provided by the virtual central core interface (e.g., VCCI 440).

In one example, a plurality of packet processors are connected to all available central core processing devices for forming a single system for avoiding multiple disconnected switching domains. In one embodiment, process 700 provides that all communication between central core processing devices occurs through the virtual central core interface. In one example, the virtual central core interface receives data updates from the plurality of packet processing interfaces for the plurality of central core processing devices.

The system 600 may include one or more source programs, executable programs (object code), scripts, or any other entity comprising a set of computer program instructions to be performed. When the system 600 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

In one embodiment, where the system 600 is implemented in hardware, the system 600 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system comprising:
   a plurality of central core processing devices each including:
      a virtual central core interface for establishing scaled-out and distributed virtual communication connections with the plurality of central core processing devices; and
      a packet processor interface manager coupled with a plurality of packet processing interfaces; and
   a plurality of packet processors each comprising:
      a packet processor thread manager for managing and processing packets received by the central core processing devices; and
      a plurality of central core processing interfaces for providing connectivity between the plurality of packet processors and the plurality of central core processing devices,
   wherein the plurality of packet processing interfaces and the plurality of central core processing interfaces are configured to provide scaled-out and distributed coupling of the plurality of packet processors to one or more central core processing devices,
   wherein the system is configured to dynamically adds additional packet processors and connects the additional packet processors to the plurality of central core processing devices based on dynamic packet processing bandwidth demand.

2. The system of claim 1, wherein each of the plurality of central core processing devices comprises a switching central core processing application specific integrated circuit (ASIC), and each of the plurality of packet processors comprises a packet processing ASIC.

3. The system of claim 2, wherein the plurality of central core processing interfaces and the plurality of packet processing interfaces are configured to provide messaging between the packet processors and the central core processing devices.

4. The system of claim 1, wherein the plurality of central core processing devices are configured to exchange messaging with one another through virtual connections provided by the virtual central core interface.

5. The system of claim 1, wherein each central core processing device further comprises:
   a traffic manager module that provides traffic management for communication data packets.

6. The system of claim 5, wherein each central core processing device further comprises:
a lookup table manager module coupled with the traffic manager module for interfacing with one or more central lookup tables comprising one or more ternary content-addressable memory (TCAM) devices that provide storing, deleting, and retrieving of central core processing device lookup entries.

7. The system of claim 6, wherein each packet processor further comprises a lookup table cache memory that receives forwarding entries from the one or more central lookup tables for use by each packet processor for performing local lookup table operations.

8. The system of claim 7, wherein lookup table entries are synchronized between core processing devices and packet processors.

9. The system of claim 8, where lookup table entries for the plurality of central core processing devices are synchronized via the virtual central core interface.

10. The system of claim 8, wherein a plurality of serializers/deserializers (SerDes) lanes in the plurality of central core processing interfaces and the plurality of packet processing interfaces are flexibly bundled to form interfaces of various bandwidths.

11. The system of claim 10, wherein a number of SerDes lanes used is proportional to packet processing capability or bandwidth of the plurality of packet processors.

12. A system comprising:
a first application-specific integrated circuit (ASIC) including one or more central core processing devices, wherein the one or more central core processing devices each comprising:
a virtual central core interface for establishing scaled-out and distributed virtual communication connections with other central core processing devices; and
a packet processor interface manager coupled to a plurality of packet processing interfaces; and
a second ASIC including one or more packet processors, wherein the one or more packet processors comprising:
a packet processor thread manager for managing and processing packets received by the one or more central core processing devices; and
a plurality of core processing interfaces for providing connectivity between the one or more packet processors and the one or more central core processing devices, wherein the packet processor interface manager is coupled with the plurality of packet processing interfaces for scaled-out and distributed coupling of the one or more packet processors to the one or more central core processing devices, wherein the system is configured to dynamically adds additional packet processors and connects the additional packet processors with the one or more central core processing devices based on dynamic packet processing bandwidth demand.

13. The system of claim 12, wherein the additional packet processors add additional switching and packet processing bandwidth for the system, wherein a number of network interface ports in the system increases proportionally with increased network processing bandwidth.

14. The system of claim 13, wherein the plurality of central core processing interfaces and the plurality of packet processing interfaces are configured to provide messaging between the one or more packet processors and the one or more central core processing devices for exchanging messages with one another through connections provided by the virtual central core interface.

15. The system of claim 14, wherein the one or more central core processing devices further comprise:
a traffic manager module that provides traffic management for communication data packets; and
a lookup table manager module coupled with the traffic manager module for interfacing with one or more central look up tables that provide storing, deleting, and retrieving of central core processing device lookup entries.

16. The system of claim 15, wherein each packet processor further comprises a lookup table cache memory that receives forwarding entries from the one or more central lookup tables for use by each packet processor for performing local lookup table operations.

17. The system of claim 16, wherein lookup table entries are synchronized between core processing devices and packet processors, and lookup table entries for the one or more central core processing devices are synchronized via the virtual central core interface.

18. A method comprising:
providing scaled-out and distributed virtual communication connections with a system comprising a plurality of central core processing devices using a virtual central core interface;
coupling a plurality of packet processing interfaces for scaled-out and distributed connectivity of a plurality of packet processors with one or more central core processing devices;
managing packets received by central core processing devices; and
dynamically adding, packet processors and connecting added packet processors to the central core processing devices based on dynamic packet processing bandwidth demand.

19. The method of claim 18, further comprising:
providing messaging between the packet processors and the central core processing devices using the plurality of central core processing interfaces and the plurality of packet processing interfaces; and
exchanging messaging between the plurality of central core processing devices through connections provided by the virtual central core interface.

20. The method of claim 19, further comprising:
connecting the plurality of packet processors to all available central core processing devices for forming a single system for avoiding multiple disconnected switching domains.

21. The method of claim 20, wherein all communication between central core processing devices occurs through the virtual central core interface.

22. The method of claim 21, wherein the virtual central core interface receives data updates from the plurality of packet processing interfaces for the plurality of central core processing devices.

23. The method of claim 21, wherein during data processing, an original data packet remains in a buffer memory of an ingress central core block, and the original data packet directly moves to a destination central core block after a packet processor completes a lookup and requests the destination central core block to transmit the original data packet out of the buffer memory.

24. The method of claim 23, further comprising:
receiving lookup table entries by a central core block based on a request from the central core block; and
populating the lookup table entries in a local look-up table cache upon a lookup table fault occurring.

* * * * *